(12) United States Patent
Kendall et al.

(10) Patent No.: US 9,182,291 B2
(45) Date of Patent: Nov. 10, 2015

(54) DEVICE FOR MEASURING TEMPERATURE IN MOLTEN METAL

(71) Applicant: Heraeus Electro-Nite International N.V., Houthalen (BE)

(72) Inventors: Martin Kendall, Zonhoven (BE); Marek Grabowy, Bedziemysl (PL)

(73) Assignee: Heraeus Electro-Nite International N.V., Houthalen (BE)

( * ) Notice: Subject to any disclaimer, the term of this patent is extended or adjusted under 35 U.S.C. 154(b) by 308 days.

(21) Appl. No.: 13/804,815

(22) Filed: Mar. 14, 2013

(65) Prior Publication Data

US 2013/0243031 A1     Sep. 19, 2013

(30) Foreign Application Priority Data

Mar. 14, 2012   (DE) .......................... 10 2012 004 987

(51) Int. Cl.
*G01K 1/12* (2006.01)
*G01K 1/10* (2006.01)

(52) U.S. Cl.
CPC ................ *G01K 1/125* (2013.01); *G01K 1/105* (2013.01)

(58) Field of Classification Search
CPC ......... H01K 1/125; H01K 1/105; H01K 1/08; H01K 1/12; H01K 1/18
USPC ....................................................... 374/139
See application file for complete search history.

(56) References Cited

U.S. PATENT DOCUMENTS

| | | | | |
|---|---|---|---|---|
| 3,010,837 A | * | 11/1961 | Rice | 501/100 |
| 3,278,341 A | | 10/1966 | Gee | |
| 3,896,674 A | * | 7/1975 | Kolb | 73/866.5 |
| 4,293,463 A | * | 10/1981 | Vroom | 524/493 |
| 4,871,263 A | | 10/1989 | Wilson | |
| 5,209,571 A | * | 5/1993 | Kendall | 374/139 |
| 5,388,908 A | * | 2/1995 | Kendall | 374/140 |
| 8,033,717 B2 | * | 10/2011 | Kendall | 374/139 |
| 2006/0002449 A1 | | 1/2006 | Kendall | |

(Continued)

FOREIGN PATENT DOCUMENTS

| | | |
|---|---|---|
| CN | 1721106 A | 1/2006 |
| CN | 101941846 A | 1/2011 |
| DE | 7419633 U | 10/1974 |

(Continued)

OTHER PUBLICATIONS

English translation of the search report issued Jun. 25, 2014 in CN Application No. 201310064201.3.

(Continued)

*Primary Examiner* — Lisa Caputo
*Assistant Examiner* — Philip Cotey
(74) *Attorney, Agent, or Firm* — Panitch Schwarze Belisario & Nadel LLP

(57) ABSTRACT

A device for measuring the temperature in molten metals contains a thermocouple arranged in a ceramic tube that is closed on one side, and has an external protective body that surrounds the tube, forming an annular space between the outer surface of the tube and the inner surface of the protective body. The protective body is formed of a mixture containing 75 to 90% by weight aluminum oxide, 2 to 10% by weight silicon oxide, 7 to 15% by weight graphite, 0.1 to 1% by weight $Fe_2O_3$, 0.1 to 1% by weight ($K_2O+Na_2O$), and 0.1 to 1% by weight MgO.

9 Claims, 1 Drawing Sheet

(56) References Cited

U.S. PATENT DOCUMENTS

2007/0203013 A1* 8/2007 Harmuth .................. 501/133
2010/0207306 A1* 8/2010 Kendall ..................... 266/99

FOREIGN PATENT DOCUMENTS

| DE | 4207317 A1 | 9/1993 |
|---|---|---|
| DE | 102005040311 B3 | 10/2006 |
| EP | 0558808 B1 | 6/1998 |
| GB | 2 193 375 A | 2/1988 |

OTHER PUBLICATIONS

Office Action issued Feb. 25, 2014 in CA Application No. 2,807,856.
Office Action issued Dec. 7, 2012 in DE Application No. 10 2012 004 987.0.

* cited by examiner

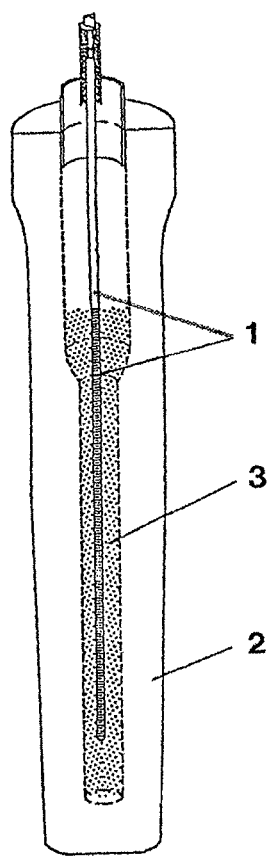

DEVICE FOR MEASURING TEMPERATURE IN MOLTEN METAL

BACKGROUND OF THE INVENTION

This invention relates to a device for measuring temperature in molten metals. The device contains a ceramic tube that is closed on one side, a thermocouple arranged in the tube, and an external protective body that surrounds the tube, forming an annular space between the outer surface of the tube and the inner surface of the protective body.

A device of this type is known from GB-A-2193375. This document describes a thermocouple surrounded by a metal tube, in particular one made of molybdenum. In addition, the molybdenum tube is surrounded by an oxidic coating. Further devices of this type are known from EP 558808B1, which describes the advantage of filling the annular space between a protective body and a thermocouple tube.

Similar devices are known, for example, from German utility model GM 74 19 633. The arrangement described therein contains a tube that is closed on one side and surrounds a thermocouple inserted into a protective body made of heat-resistant metal oxide and graphite, whereby an annular gap is formed between the tube that is closed on one side and the protective body. For operation at the high temperatures that are common in molten metals, the thermocouple arranged in the tube is made of expensive materials, such as platinum. However, in continuous temperature measurements, which are required for continuous control of the molten metal, the thermocouple is insufficiently protected on the inside of this arrangement because reactive gases and/or corrosive gases, in particular, penetrate through the shells surrounding the thermocouple and thus can destroy the shells and the thermocouple. For this reason, it may be necessary to replace the thermocouple several times. Also, exposed to the high temperatures in the molten metal, silicon monoxide and carbon monoxide, for example, form inside the protective body of the device and penetrate through the aluminum oxide tube surrounding the thermocouple. The carbon monoxide increases the porosity of the tube, which slowly destroys the tube. Further, the silicon monoxide reacts with the thermocouple wire, effectively destroying the wire and rendering the temperature measurement incorrect and impossible to conduct.

Another device of the type described above is known from GB-B 2 193 375. The thermocouple in this device is surrounded by a ceramic-coated impermeable molybdenum tube that is closed on one side and is embedded in the protective body by means of a ceramic mass. This molybdenum tube is very expensive and laborious to produce. In order to prevent destruction due to thermomechanical tension, the molybdenum tube is surrounded by multiple ceramic layers having molybdenum contents that decrease from inside to outside. One of the purposes of these layers is to compensate for temperature gradients along the molybdenum tube. However, these ceramic layers and the molybdenum tube may also be destroyed by reactive gases, such as carbon monoxide or silicon monoxide.

BRIEF SUMMARY OF THE INVENTION

The object of the present invention is to provide a temperature measuring device with a thermocouple that has a longer service life than prior art devices.

This object is achieved by a device which contains a ceramic tube that is closed on one side, a thermocouple arranged in the tube, and an external protective body that surrounds the tube, forming an annular space between the outer surface of the tube and the inner surface of the protective body. The protective body according to the invention is made of a mixture containing 75 to 90% by weight aluminum oxide, 2 to 10% by weight silicon oxide, 7 to 15% by weight graphite, 0.1 to 1% by weight $Fe_2O_3$, 0.1 to 1% by weight ($K_2O$+ $Na_2O$), and 0.1 to 1% by weight MgO, as well as inevitable impurities, if any. This material provides a protective body with high compressive strength and flexural strength that is also more corrosion- and erosion-resistant than protective bodies made of known materials.

BRIEF DESCRIPTION OF THE SEVERAL VIEWS OF THE DRAWINGS

The foregoing summary, as well as the following detailed description of the invention, will be better understood when read in conjunction with the appended drawing. For the purpose of illustrating the invention, there is shown in the drawing embodiments which are presently preferred. It should be understood, however, that the invention is not limited to the precise arrangements and instrumentalities shown.

In the drawing:

FIG. 1 is a schematic view of a temperature measuring device according to an embodiment of the invention.

DETAILED DESCRIPTION OF THE INVENTION

Advantageously, the annular space in the device according to the invention is filled with at least one metal oxide powder and aluminum as an oxygen-reducing agent. Oxygen-reducing agents prevent corrosive and/or reactive gases, such as, for example, silicon monoxide and carbon monoxide, from reaching the tube that surrounds the thermocouple, and from destroying the tube and the thermocouple. Instead, when the reducing agent is oxidized, silicon and carbon, which attack neither the thermocouple nor the surrounding tube, are formed.

Preferably, the aluminum oxygen-reducing agent is provided as a powder and is mixed with the metal oxide powder(s). This allows the oxygen-reducing agent to be distributed homogeneously throughout the annular space and ensures high effectiveness of this agent. It is equally feasible to provide the oxygen-reducing agent in the form of rods that are arranged, for example, approximately parallel to the tube that is closed on one side. These aluminum rods are embedded in the metal oxide powder. It is also within the scope of the invention to arrange the aluminum rods in any other way, but arranging them parallel to the tube is most effective with regard to the reducing effect. Providing the oxygen-reducing agent in the form of wires, pellets and/or grains embedded in the metal oxide(s) is also feasible. It is also within the scope of the invention for the oxygen-reducing agent in the annular space to surround the metal oxide powder(s) like a tube. The tube may comprise cylinder walls that are closed or are provided with openings. A tube-like arrangement of a powder is also conceivable. Combining multiple forms of the oxygen-reducing agent is also within the scope of the invention. In general, the shape of the oxygen-reducing agent is not limited to any specified shapes.

However, the oxygen-reducing agent is preferably distributed throughout the entire annular space for optimal effectiveness. Importantly, the oxygen-reducing agent should not directly connect the tube that is closed on one side and the protective body, since a connection of this type may lead to the formation of thermal bridges that can expose the tube to uneven thermomechanical stress. Pertinent insulation is provided by the metal oxide powder(s). The metal oxide powder arranged in the annular space may comprise one metal oxide or a mixture of two or more metal oxides selected from the group consisting of aluminum oxide, magnesium oxide, zirconium oxide, and titanium oxide. The use of aluminum oxide has proven to be particularly expedient since it is very inexpensive.

Preferably, the aluminum content, relative to the filling of the annular space, is about 25% by volume to about 65% by volume, more preferably about 40-50% by volume, and about 15% to about 70% by weight.

An exemplary device for measuring the temperature in molten metals according to the invention is shown in FIG. 1. The device comprises a thermocouple that is arranged in a known manner in a ceramic twin tube (not shown here). This is surrounded by an aluminum oxide tube 1 that is closed on one side. The hot soldering site of the thermocouple is in the vicinity of the closed end of the aluminum oxide tube 1, as close as possible to being right at the end.

The aluminum oxide tube 1 that is closed on one side is inserted into a protective body 2 that consists of a heat-resistant metal oxide, such as, for example, aluminum oxide, and graphite. For inserting the aluminum oxide tube 1 that is closed on one side, the protective body 2 comprises a hollow space that is arranged in longitudinal direction of the protective body 2 and extends through the protective body 2 at its end facing away from the closed immersion end. The aluminum oxide tube 1 with the thermocouple is inserted into the protective body 2 through the opening thus generated. The diameter of the hollow space is approximately 8-15 mm larger than the diameter of the aluminum oxide tube 1. This generates an annular space 3 between the protective body and the thermocouple tube.

The protective body may be formed from a mixture containing 75 to 90% by weight aluminum oxide, 4 to 10% by weight graphite, 4 to 10% by weight phenol resin, and 1 to 7% by weight of an antioxidant. Also, the protective body may be produced from a mixture containing 75 to 90% by weight aluminium oxide which contains MgO and $Fe_2O_3$, 4 to 10% by weight graphite, 4 to 10% by weight phenol resin (thermosetting resin) to reinforce the protective body, and 1 to 7% by weight of silicon as an antioxidant. During mixing of the components, the mixture may be dried at temperatures between room temperature and 90° C. Thereafter, the mixture may be shaped and pressed and finally heated, whereby after a first heating step a glaze of an aqueous solution (e.g., borosilicate with $Na_2O$ and $K_2O$ as melting point lowering components) is sprayed onto the outer surface of the protective body to form a layer having a thickness of 0.25 mm, for example. The glaze prevents decarburisation of the material during firing and use. Finally, the protective body is fired at temperatures of up to 900° C. During this process, the silicon reacts to form $SiO_2$, and inevitable impurities react to form $Fe_2O_3$, $K_2O$, $Na_2O$ and MgO.

The protective body according to the invention is thus preferably made of a mixture containing 75 to 90% by weight aluminum oxide, 2 to 10% by weight silicon oxide, 7 to 15% by weight graphite, 0.1 to 1% by weight $Fe_2O_3$, 0.1 to 1% by weight ($K_2O+Na_2O$), and 0.1 to 1% by weight MgO, as well as inevitable impurities, if any. An exemplary finished protective body comprises about 82% by weight $Al_2O_3$, about 6% by weight $SiO_2$, about 11% by weight carbon in the form of graphite, about 0.4% by weight $Fe_2O_3$, about 0.3% by weight $K_2O+Na_2O$, and about 0.3% by weight MgO.

The protective tube preferably has a compressive strength of about 40 to 50 Mpa at room temperature, and a flexural strength of about 6 to 9 Mpa at room temperature and of 10 to 15 Mpa at 1,450° C. Preferably, the density of the material used to form the protective tube is about 2.8 to 3 $g/cm^3$ and the open porosity is about 10 to 15%. It is also advantageous for the mean grain size of the mixture of the material of the protective body to be less than 1 mm. This increases the corrosion and erosion resistance, for example, when the device is used in molten steel. Due to its corrosion and erosion resistance, the protective body has a longer service life than known protective bodies and provides high stability during its use in molten steel.

The oxygen-reducing aluminum melts when the device is heated in the molten metal, such as, for example, in molten steel. However, the molten aluminum is prevented from flowing downward into the closed tip of the protective body 2 because the molten aluminum immediately penetrates into the hollow spaces formed through the aluminum oxide powder.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A device for measuring a temperature in molten metals, wherein the device comprises a ceramic tube closed on one side, a thermocouple arranged in the ceramic tube, and an external protective body surrounding the ceramic tube, wherein an annular space is formed between an outer surface of the ceramic tube and an inner surface of the protective body, and wherein the protective body is formed from a material comprising a mixture of 75 to 90% by weight aluminum oxide, 2 to 10% by weight silicon oxide, 7 to 15% by weight graphite, 0.1 to 1% by weight $Fe_2O_3$, 0.1 to 1% by weight of a mixture of $K_2O+Na_2O$, and 0.1 to 1% by weight MgO.

2. The device according to claim 1, wherein the annular space is filled with at least one metal oxide powder and an aluminum oxygen-reducing agent, and wherein the aluminum comprises about 15% by weight to about 70% by weight of the filling of the annular space.

3. The device for measuring a temperature according to claim 2, wherein the aluminum oxygen-reducing agent is a powder and is mixed with the at least one metal oxide powder.

4. The device for measuring a temperature according to claim 2, wherein the at least one metal oxide is selected from the group consisting of aluminum oxide, magnesium oxide, zirconium oxide, and titanium oxide.

5. The device for measuring a temperature according to claim 4, wherein the at least one metal oxide powder consists essentially of aluminum oxide.

6. The device according to claim 1, wherein a density of the protective body material is about 2.8 to 3 $g/cm^3$.

7. The device according to claim 1, wherein the protective body material has an open porosity of 10 to 15%.

8. The device according to claim 1, wherein a mean grain size of the protective body material is less than 1 mm.

9. The device for measuring a temperature according to claim 3, wherein the at least one metal oxide is selected from the group consisting of aluminum oxide, magnesium oxide, zirconium oxide, and titanium oxide.

* * * * *